United States Patent

[15] 3,638,335

Gundersen et al.

[45] Feb. 1, 1972

[54] EDUCATIONAL DEVICE

[72] Inventors: Allan A. Gundersen, Sinking Spring; Fred T. Ramsey, Oley, both of Pa.

[73] Assignee: Wyomissing Corporation

[22] Filed: Feb. 2, 1970

[21] Appl. No.: 7,777

[52] U.S. Cl. .................................35/36, 35/9 G, 117/1.7, 283/6
[51] Int. Cl. .........................................G09b 11/04
[58] Field of Search...........................35/9 R, 36, 37, 66, 9 G; 283/6; 117/1.7

[56] References Cited

UNITED STATES PATENTS

| 3,363,336 | 1/1968 | Skinner | 35/36 |
| 3,359,651 | 12/1967 | Mair | 35/9 R |
| 3,512,273 | 5/1970 | Baker, Jr. et al. | 35/37 X |

*Primary Examiner*—Wm. H. Grieb
*Attorney*—Synnestvedt and Lechner

[57] ABSTRACT

A self-instructive, autocorrective device is provided as may be useful, for example, for teaching the formation of characters, such as letters, geometric shapes and indicia. The device comprises a work surface having first and second areas initially indistinguishable from each other. A color change or formation can be induced in either the first or second area by contacting them with a marking element. The areas differ from each other in that the color change or development in the first area is substantially instantaneous while the color change or development in the second area does not become visible for a delayed period of time. Accordingly, the device is self-instructive since it provides an immediate reward to the student when the writing instrument is moved within the first area, and it is autocorrective since, after the exercise has been completed, a color change or development becomes visible in the second area to indicate the extent to which the student may have strayed from the first area in performing the prescribed exercise.

9 Claims, 3 Drawing Figures

PATENTED FEB 1 1972          3,638,335

INVENTORS
ALLAN A. GUNDERSEN
FRED T. RAMSEY

BY *Synnestvedt & Lechner*

ATTORNEY

EDUCATIONAL DEVICE

BACKGROUND OF THE INVENTION

1. Field of the Invention

This invention relates to self-instructive devices and, more particularly, to self-instructive devices that are also autocorrective that may be used, for example, for teaching or developing the minds of students, for instance, by teaching the formation or reproduction of letters, numerals, geometric shapes, other characters, and spatial relationships. The device of this invention is of the type in which a student is instructed to reproduce a letter or shape on a piece of paper commencing from an established starting point and, to the extent that the student properly reproduces the figure, he will be rewarded with a color change or development indicating the letter or character that has been correctly written or drawn.

2. Description of the Prior Art

Systems have been proposed to teach children manipulative processes with their hands and fingers and to teach them the reproduction of various figures such as letters of an alphabet. Such teaching devices are disclosed, for example, in Skinner U.S. Pat. No. 3,363,336, the general teachings of which are incorporated herein by reference. Teaching devices of this sort employ worksheets on which latent images are printed but which images are indiscernible from the rest of the sheet. These latent images can be developed or made visible if the student traces over the area of the latent image with a stylus in accordance with the student's observation of a visible control image. The stylus contains a solution that is formulated so that, in combination with chemicals contained in the latent image, a chemical reaction takes place that causes a color change or formation. By these means, the latent image becomes immediately visible to the student when he correctly reproduces the figure.

Worksheets may also be provided in which the visible control image is not necessarily geometrically identical with the latent image to be made visible, but in which the control image is, nevertheless, logically related to the latent image. For example, the control image may comprise a picture or drawing of a cat, and the latent image to be made visible may comprise the letter "C," the student being called upon to make visible the first letter or all of the letters of the name of the picture of the animal or of any specified article.

It has become a fairly well accepted principle or tenet of behavioral psychology that the learning process is stimulated by a reward or reinforcement following or resulting from a correct performance by the student. It is also recognized that the reward or reinforcement to the student should occur directly and substantially simultaneously with the correct performance so that no intermediate stages of reasoning are required. Any delay, no matter how slight, in obtaining the reward will detract from the learning process.

In terms of classical educational practices, a student may be assigned a task to perform, such as repetitively writing a letter of the alphabet, the exercise is collected by the teacher after it has been completed, and then the teacher examines the worksheet and corrects any errors that the student may have made. It is readily apparent that such a system does not provide any reinforcement to the student at the time the exercise is being performed, but rather such reinforcement, if any is to be obtained, must await a teacher's review of the exercise, the correction of the exercise, and its return to the student. As this delay may sometimes be measured in terms of days, the principle of immediate reinforcement is often lost.

In the period that elapses between the time a student performs an exercise and a teacher corrects it and returns it to the student, the student is not aware of his errors and may continue making similar errors in further practice. In this instance, not only is the advantage of immediate reinforcement lost, but also a "negative" reinforcement takes place as the student continues to repeat and practice his errors.

Perhaps a more subtle criticism of this classic system of instruction lies in the fact that the student may feel, when the teacher corrects his exercises, that he is not so much being rewarded for work he has done well as he is being criticized for work he has done poorly. As suggested by at least one leading behavioral psychologist, it is better to use a system of positive reinforcement, such as an award-credit system, rather than to take an aversive approach wherein the student's motivation is to avoid the consequences of not properly performing.

Devices disclosed in the Skinner Patent take the above psychological factors into account. Since a color change or development occurs substantially instantaneously with the passage of the stylus over the latent image, the student receives immediate reinforcement, is immediately made aware of errors, and the reinforcement is a positive rather than an aversive one. Devices of this sort may provide for some color formation, not only over the latent image, but also in the immediately adjacent or background area. This second color formation in the background area can be caused by the reaction of chemicals in the paper with those of the writing fluid or may be due to the color of the writing fluid itself. For example, a solution of ferric chloride, which has sometimes been used as the writing fluid, has a pale yellow color.

Somewhat similar systems have also been proposed in which no color development or formation takes place outside of the latent image area.

The first of these systems, that is, the one in which contrasting colors are developed in the image and background areas, suffers from the defect that the student will obtain an immediate reinforcement and positive reward not only when the line of the latent image is correctly traced with the writing instrument, but also when the writing instrument is repeatedly passed back and forth over the general area in which the latent image is located in a scribbling-type activity. Since the stylus repeatedly passes over the image lines and into the adjacent areas of the worksheet, due to the development of contrasting colors, the reward to the student may be greater than that which results when the student stays within the confines of the latent image area and only develops a single color.

In the second type of system, color may be developed only in the latent image area. Here the student does not receive a two-color positive reinforcement from a scribbling-type movement of the writing instrument, but he can succeed in obtaining a positive reward of a fully developed latent image. This system is also disadvantageous since color development does not take place outside of the latent image areas and the teacher may be unaware, when the paper is corrected later, of the incorrect activities of the student and his method for circumventing the learning process.

A third system has been proposed in copending U.S. Pat. application 753,005, now U.S. Pat. No. 3,512,273, owned by common assignee and incorporated herein by reference, in which the area surrounding the latent image is provided with materials that will obscure or otherwise obfuscate the development of the latent image upon traverse of the stylus or marking element from one of the areas into the other. In this system, a clearly defined image may be developed in the latent image area only if the student follows the prescribed path with his writing instrument. If he attempts to use a scribbling-type motion, or if he deviates to any substantial extent from the latent image area, the development of the latent image will, at least in part, be obscured and thus impair the reinforcement or reward that will be obtained if the correct path is followed with the writing instrument.

This third system is advantageous as it encourages the student accurately to trace the desired pattern. However, since many of these systems depend upon temporary blinding of the capillaries of the writing instrument or upon momentary neutralization of the developing fluid within the writing instrument, the development of the latent image upon return of the stylus from the background area to the latent image area may be momentarily delayed until the blinded capillaries of the writing instrument or the neutralized development fluid is wiped free of the tip of the writing instrument. Thus, unless the composition of the writing fluid and the materials contained in the image and background areas are carefully selected and formulated, the student may incur some momentary disappointment and frustration during those few moments that this writing instrument is ineffective to cause a color formation within the latent image area. Also, while the lack of color development will indicate to the teacher that the student strayed from the latent image area, the extent and nature of the errant writing instrument will not be known to the teacher so that effective remedial help can be prescribed, if indicated.

SUMMARY OF THE INVENTION

Accordingly, it is an object of this invention to provide a self-instructive teaching device that provides an immediate and positive reinforcement to the student for performing an exercise correctly.

Another object of this invention is to provide a self-instructive teaching device that will enable the student immediately to determine his own errors in performing an exercise so that errors will not be inadvertently repeated.

Another object of this invention is to provide a self-instructive teaching device that will provide a positive reward to the student only if he performs an exercise in the prescribed manner.

Another object of this invention is to provide a self-instructive teaching device that is autocorrective and will provide the teacher with a visual indication of the extent and manner to which the pupil deviated from the proper performance of an exercise, which visual evidence will neither detract from nor interfere with the pupil's learning process or his ability to obtain an instantaneous positive reinforcement for performing proper work.

Another object of this invention is to provide an individually programmed instruction for teaching finger manipulation and coordination so that a student may advance as rapidly or as slowly as his personal needs may dictate.

These and other objects of this invention are achieved by selecting and proportioning the reagents within the writing fluid, the latent image area, and the background area, so that a substantially instantaneous color development will occur when the reagents of the latent image area are contacted by the reagents of the writing instrument, but so that the color development of the background area, upon contact by the reagents of the writing instrument, will either be delayed or not visible for some period of time. By these means, when the student is performing the exercise, he will obtain the immediate reward of color development only if he stays within the prescribed latent image area. If he strays outside of the latent image area, he will receive no reward, but at some increment of time later, as when the exercise has been completed, a color formation will become or can be made visible in the background area where the student caused the stylus to go astray, thus providing a visual indication for both the teacher and the student of the extent and nature of the student's deviation from the prescribed pattern of the latent image.

DESCRIPTION OF THE DRAWINGS

Referring to FIG. 1, there is schematically illustrated an instructional device 1 made in accordance with the teachings of this invention. The device includes a paper substrate 2 and has a latent image 3 printed upon it which is indistinguishable from the background of the paper 2.

Referring to FIG. 2, it can be seen that the substrate 2 has been coated or printed from its top surface with a comparatively high chemical density area 5—5 that form portions of the latent image 3 shown in FIG. 1. The remaining portions or background area of the substrate 2 have a lesser density of chemical, such as schematically illustrated in the area 4.

Figure 1:
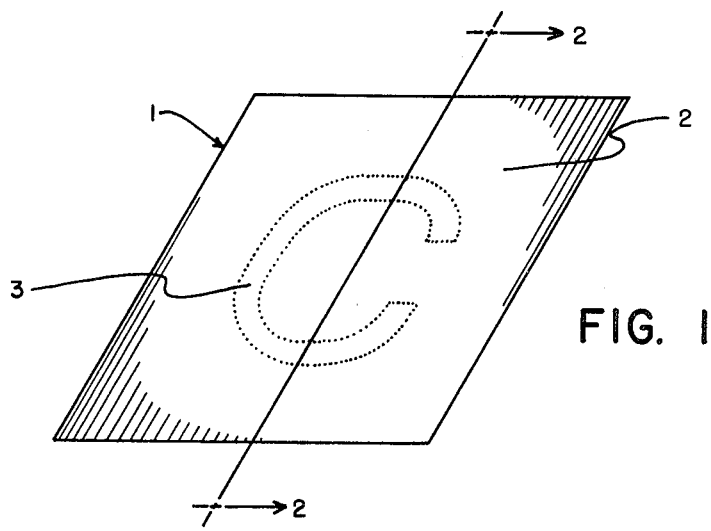
FIG. 1 is a perspective view of an instructional device made in accordance with this invention.

In a preferred method of practicing this invention, a stylus is filled with a chemical solution that is capable of reacting with the chemicals in areas 5—5 and 4 to cause a color change or formation. Due to the selection of the proper chemical systems in combination with each other, the color change or development in area 5—5 will be immediate. However, due to the lesser concentration of chemicals in the background area 4, the color change or formation will be delayed. As pointed out above, this combination enables the student to obtain an immediate visual reward when he stays within the area of the FIG. 3 to be drawn. However, if he strays outside of this area into the background area 4, no immediate reward is forthcoming. After a period of time and after the exercise has been completed, a color development or change will become visible in the background area 4 to the extent the student has strayed from the latent image area 3 with his stylus. Such later color development will provide both the student and the teacher with a visual representative of any errors the student may have made in forming the desired FIG. 3. By these means, the device is self-instructive in that an immediate reward is given to the student when the exercise is properly performed, and is also self-corrective in that, after the exercise has been performed, a permanent visual display is presented showing the degree, if any, to which the student erred in the performance of the exercise.

In addition to a chemical system that will cause a color development to take place at a different rate in the background area than in the image area, systems may be used in the practice of this invention wherein the color development will not be seen in the background until the background area is treated in some manner as by heat or chemicals. In this instance, any of the so-called "invisible inks" can be used as one component of the writing fluid and a chemical reagent that can develop the latent image is used as the other active component of the fluid. It is unnecessary herein to give details as to the composition of any of the invisible inks as this is all well known and is discussed in detail in many prior art texts.

The use of invisible inks has the disadvantage that the work sheet must be treated in some manner in order to develop color in the background area. For this reason, the use of invisible inks does not represent a preferred practice of this invention due to this inconvenience. However, from a functional standpoint, the use of invisible inks will enable accomplishing the objectives of this invention.

Another variation, which avoids the inconvenience attendant with the use of invisible inks, incorporates an optical brightener or fluorescent material within the chemical solution contained in the writing fluid. As the fluorescent material is visible only under ultraviolet light, the student will not observe any color formation in the background area if his stylus strays from the image area. However, upon exposure to ultraviolet light after the exercise has been completed, the extent to which the student caused his stylus to stray from the image area will be apparent to both teacher and student. Again, as discussed above, the writing fluid contained within the stylus also includes a reagent that will react with a reagent in the image area to cause color formation. Both of these systems, that is, those that use either invisible inks or fluorescent materials, are advantageous as they do not require the use of any reagents in the background area.

Referring again in more detail to the preferred method of this invention in which the color development in the image area and background area proceed at different rates, it has been found that oxidation/reduction reactions that are catalyzed by small changes in pH and are attendant with strong color reactions are particularly desirable. An example of such a system utilizes a solution of iodate and iodide in a neutral aqueous solution as the fluid within the writing stylus. The paper is coated or printed with a weak acid in such a manner that the acid concentration is substantially higher in the latent image area than it is in the background area. When the marking fluid contacts the image area with its high concentration of acid, an immediate color formation is obtained, but, when the writing solution contacts the background area with its considerably lesser concentration of weak acid, the development of color is delayed for some period of time.

The above system relies on the fact that iodate and iodide do not react with each other in a neutral solution, but will react, even in a very slightly acid solution, to liberate free iodine. When the free iodine is present in a solution of starch, the color transformation is quite dramatic and intense as a dark blue adsorption is formed. For this reason, starch should be present, at least on the surface of the paper substrate.

A number of weak acids can be used in forming the latent image and background areas of the paper in these oxidation/reduction systems. Suitable acids may include, for example, water soluble organic acids such as citric acid, tannic acid, acetic acid, ascorbic acid, and oxalic acid. In addition to varying the concentration of the weak acid from the image to the background area, two different acids may be used such as an acid of greater acidity in the image area and an acid of lesser acidity in the background area. It should also be noted that while the use of weak organic acids is the most convenient and the preferred system, from a functional standpoint, similar results can be obtained using very dilute solutions of strong acids. The only thing of ultimate importance is that the acidity of the system be proper no matter how it is obtained.

The exact ratio of the acid present in the latent image area to acid present in the background area is not critical and a useful ratio can easily be determined empirically. It can be understood that the exact ratio will vary depending variously upon the concentration of the iodate and iodide solution and the particular weak acid or acids systems used.

Figure 2:
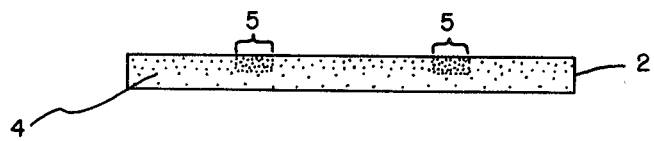
FIG. 2 is a sectional view taken along line 2—2 of FIG. 1.
Figure 3:
FIG. 3 is a sectional view of a sheet of paper prepared by an alternate method for use in the practice of this invention.

The weak acid may be added to the background area by any of several methods. As illustrated in FIG. 2, the acid can be printed or wash coated onto the surface of the paper substrate 2. As shown schematically in the drawing, the concentration of the acid in the background portion decreases from the treated surface to the untreated surface. In FIG. 3, the distribution of the weak acid in the background area is illustrated as being uniform. In this instance, rather than coating the paper substrate with the weak acid, the acid is incorporated into the paper at the time of its manufacture. This latter method, particularly if large production runs are to be made, is preferred. Similarly, starch can be incorporated in or on the paper at the time of manufacture (such as by way of sizing), but otherwise starch may be mixed with the dilute acid solution and applied as a coating on the substrate.

As noted above, after the background area (actually the entire sheet) of the paper substrate has been treated with a weakly acidic acid, an acid of somewhat greater acidity is imprinted over the top of the paper to form a latent image area 3.

Marking pens with fiber or porous plastic nibs are particularly suitable for use in applying the chemical solution to the work sheet. Conventionally, these marking pens incorporate some sort of capillary filler material, such as fiber roving, within the pen reservoir. This material frequently is a cellulose derivative and, can react with the writing fluid and lower its pH. In these instances, it has been found helpful to buffer the writing solution to protect it against pH changes that otherwise might occur in storage.

While there are many chemical systems that may be used in the practice of this invention, the iodide/iodate system described above is particularly desirable for the following reasons. First, since the educational device of this invention is intended for use primarily by young children, the chemicals contained on the paper and in the pen should not be toxic. In the concentrations here described, no toxicity hazards will exist even if a child were to eat the paper or lick writing fluid from the tip of the marking device. Second, the above-described system is quite desirable in that it is stable and has a long shelf life. This, of course, is important with school materials that must be stored over the course of a school year and sometimes from year to year. Third, the above system benefits from the fact that the reagents are inexpensive, readily available, and may be applied or incorporated into the paper without difficulty. This facilitates production and makes it possible to obtain readily reproducible results.

An example of a system slightly different from the one described above utilizes a pH adjustment to a color formation with manganese and silver salts. This system makes use of the fact that some manganese salts are essentially colorless in an acid solution but turn brown in the presence of a base. Further, manganese and silver salts are stable in very dilute acid solutions but immediately yield a vivid black precipitate in mildly alkaline solutions. Accordingly, in this system the entire surface of the paper substrate is treated with a buffered weak acid solution (pH of about 5) of a manganese salt such as manganese sulfate. The image area is then printed with a very dilute solution of a silver salt such as silver nitrate. The writing fluid contains a weak base such as sodium carbonate and, when the weak base contacts the image area, an immediate black precipitate is formed. However, if the stylus strays into the background area, the weak base will only slowly overcome the buffered acid of the paper and thus give rise, over a delayed period of time, to the development of a brown color in the background area.

In either of these two systems, a reagent in the background area may be omitted if a fluorescent material or invisible ink is mixed with the writing fluid. As explained above, color will immediately be developed within the image area, but no visible color development will take place when the stylus enters the background area unless the paper is exposed to ultraviolet light or the invisible ink is developed.

And yet another example of a chemical system that may be used utilizes chemicals that will react to form fluorescent materials. For example, the background area may be treated with a dilute neutral or acid solution of a hydrazine salt and the image area overprinted with a stronger solution of the hydrazine salt. Dimethylamino benzaldehyde is included, as in an alcohol solution, in the writing fluid and it will react with the higher concentration of the hydrazine salt to cause a visible orange or reddish color formation. On the other hand, the reaction of the benzaldehyde with the lower concentration of the hydrazine salt in the background area will not result in a visible color formation but will react to form a fluorescent material that will only become visible when exposed to ultraviolet light.

EXAMPLE

A paper substrate (Hammermill bond) having a starch sizing was uniformly treated with a 0.3 percent by weight solution of citric acid. A 2.5 percent by weight solution of citric acid was then prepared and imprinted over the treated paper after it had dried. This 2.5 percent citric acid solution, as printed, formed the latent image area. Note that in this example, the ratio of the strength of the acid solution in the latent image area to that of the background area was approximately 8:1.

A 0.8 percent by weight aqueous solution of potassium iodate and potassium iodide was prepared in which the iodate and iodide were present in a 1:1 by weight ratio. This solution was then placed in the reservoir of a felt tip type marker. When the felt tip marker containing the iodate/iodide solution was moved over the latent image area, a dark blue image was immediately developed. The felt tip marker was deliberately caused to pass out of the latent image area at the time the latent image was being developed. No color change or formation was immediately apparent, but after a period of about two minutes elapsed, the characteristic starch/iodine color could be observed in the background area.

We claim:

1. A self-instructive, autocorrective educational device in which a latent image that is visually indistinguishable from the background area of a writing surface is printed onto the writing surface with a first chemical reagent that will react to cause color formation immediately upon contact with a developing fluid, the improvement comprising a second chemical reagent in the background area that, when contacted with the developing fluid, will produce an observable color formation after a delayed period of time.

2. A self-instructive, autocorrective method for teaching pupils, which method comprises:
   printing a chemical reagent onto a writing surface and forming a latent image that is visibly indistinguishable from the background area of the writing surface;
   incorporating a second chemical reagent in said writing surface including said background area;
   filling a writing instrument with a third reagent that, upon contact with the first reagent, will react to produce an immediate color formation and which, upon contact with the second reagent in the background area, will produce a color formation subsequent in time to the development of color in the latent image area;
   whereby the method is self-instructive since it provides an immediate response for work properly done, and is autocorrective since errors are readily determinable after the exercise has been completed.

3. A system for teaching including:
   a writing surface;
   a latent image printed with a first chemical reagent on the writing surface, which image is visibly indistinct from the surrounding background area of the writing surface;
   a second chemical reagent on said writing surface including said surrounding background area;
   a capillary marking device incorporating a third chemical reagent, which third reagent, upon contact with the first reagent in the latent image, will react to produce an immediate color formation in the image area, and which third reagent, upon contact with the second reagent on said surrounding background area, will enable the development of an observable color formation in the background area after a delayed period of time.

4. A system according to claim 3 wherein the first and third reagents comprise a chemical system that is stable at one pH and reactive at another pH and, when reactive produces an immediate color formation.

5. A system according to claim 4 wherein the first reagent is a weak acid and silver and manganese salts, the second reagent is a weak acid and a manganese salt, and said third reagent is a weak base.

6. A system according to claim 4 wherein the chemical system is an oxidation/reduction system.

7. A system according to claim 6 wherein the oxidation/reduction system includes as its components iodate and iodide salts, a weak acid, and starch.

8. A system according to claim 7 wherein the first reagent includes the starch and weak acid and the third reagent includes the iodide/iodate salts.

9. A system according to claim 8 wherein the second reagent on the background area includes starch and is less acidic than the latent image area.

* * * * *